April 18, 1967   R. L. RIDGWAY ETAL   3,314,190
APPARATUS FOR APPLYING SYSTEMIC INSECTICIDES TO PLANTS
Filed March 22, 1966   3 Sheets-Sheet 1

INVENTORS
R.L. RIDGWAY
B.G. REEVES
L.H. WILKES

BY R. Hoffman
ATTORNEY ically applied to the plants. These low efficiencies
United States Patent Office 3,314,190
Patented Apr. 18, 1967

3,314,190
APPARATUS FOR APPLYING SYSTEMIC INSECTICIDES TO PLANTS
Richard L. Ridgway, College Station, Beverly G. Reeves, Bryan, and Lambert H. Wilkes, College Station, Tex., assignors to the United States of America as represented by the Secretary of Agriculture
Filed Mar. 22, 1966, Ser. No. 536,332
1 Claim. (Cl. 47—1.5)

A non-exclusive, irrevocable, royalty-free license in the invention herein described, throughout the world for all purposes of the United States Government, with the power to grant sublicenses for such purposes, is hereby granted to the Government of the United States of America.

This invention relates to and provides a method and an apparatus for applying insecticides to plants. More particularly, this invention relates to a method for controlling cotton insect pests and involves an apparatus for the application of systemic type insecticides to specific portions of the growing plant.

In general, the objectives of this invention are accomplished by the directed, uniform application of effective amounts of a systemic type insecticide in particular areas of the individual plants in a row crop, to the end that the least amount of applied insecticide produces maximum benefit.

The problems of toxic residue and unintentional proximity contamination, as they relate to the application of insecticides generally, are widely recognized and in many areas are becoming critical. Chemical residues in soils, which residues result from prolonged or excessive use of chlorinated hydrocarbon insecticides, may contaminate root-type vegetables where such crops are grown in rotation with cotton. The contamination of animal feed by airborne drift can occur when sprays or dusts of certain insecticides are used to control insect pests in the vicinity of forage crops. Accordingly, it has become important to devise ways of eliminating or at least of minimizing contamination problems wherever the use of toxic agricultural chemicals is required.

Most chemical insecticides intended for foliar application are toxic both to beneficial insects and to economic pests, thus in the absence of beneficial insects, pest insect populations often increase more rapidly than they would increase under normal, biologically balanced conditions. A biological balance between beneficial insects and pest insects often does not exist in cotton fields, so the use of insecicides is a vertual necessity in modern cotton production.

Systemic insecticides inherently possess several distinct advantages over foliar applied insecticides. The systemic insecticide is more effective for controlling insects that are difficulty accessible to the spray or to dust application of surface applied insecticides. Moreover, the systemic insecticides are generally less destructive to certain species of beneficial insects. Systemic insecticides are characterized by reason of the advantageous fact that plant growth which occurs after the time of application of a systemic insecticide is rendered toxic by translocation of insecticide within the plant by the sap stream. Also, there is some basis for the hope that systemic insecticides can be used to control insect pests that feed for a portion of their life cycle inside the fruits of the plant.

Aside from residue and contamination problems, are the quite unattractive economic factors associated with conventional insecticide application (i.e., dusting and spraying. It has been estimated that expenditures for the control of cotton insect pests average five to seven cents per pound of lint cotton produced. Despite the cost, in conventional dusting and spraying techniques, no more than ten to twenty percent of the discharge insecticide is actually applied to the plants. These low efficiencies are attributable to many things, but one primary cause is the uncontrolled airborne drift which results from the low directional control of the insecticide spray or dust after it has been released from the applicator.

The use of systemic insecticides at one promises some real advantage from an economic standpoint, since complete coverage of the plants with dust or liquid particles is not imperative if the insecticide can be distributed throughout the plant via translocation. One limitation of systemic insecticides in the past has been the problem of introducing the insecticide into the plant. Translocation of a systemic insecticide occurs in the sap flow or the transpiration stream of the plant and this is a one-way flow from the roots into the leaves. For this reason, foliar application does not produce a true systemic plant effect. Obviously, a systemic insecticide must be applied to the plant roots or as close to the root area as is feasible if the full potential of the insecticide is to be realized.

Systemic insecticide applications in cotton insect pest control, presently are limited primarily to seed and in-furrow treatment. Operations associated with these applications have been mechanized and now fit satisfactorily into the current mode of mechanized cotton production. The residual effect of either seed or of furrow treatment is limited (six to ten weeks from planting time at best) and hence, foliar sprays or dusts are presently the only practical alternatives available for mid-season or for late-season insect control.

The stem application of systemic insecticides has been contemplated and if consideration is given to the fact that certain of the known systemic insecticides will, within a few days of application to the plant stalk, translocate to the leaves of the plant with efficiencies as high as 80%, then the practical excellence of such a method will be apparent.

Some limited evaluations of the control of spider mites, cotton fleahoppers, lygus bugs, boll weevils, and boll worms have indicated promise, but the fact that mechanical stem application equipment has not heretofore been available has prevented a determination of the full potential of stem application techniques for insecticides. Without satisfactory mechanized equipment, this technique and the results obtainable in terms of insect control, can be of no more than academic interest. We have, for the reasons set forth above, devised an apparatus suitable for applying a systemic insecticide to particular portions (i.e, the stalk portions) of the cotton plant.

It is an objective of the instant invention to provide an apparatus capable of applying a flowable material, at a uniform rate, to selected portions of the substantially erect, individual plants of a row crop. The apparatus comprises, as a unit, paired disc members incorporating radially extended, peripheral bristles, said disc members horizontally disposed in juxtaposition and with peripheral bristle tips in tangential mesh; means defining casings adapted to rotatably support and to protect said disc members, said casing means comprising a contoured cover enclosing each of said disc members except for that segment of each disc member adjacent the location at which the bristle tips mesh; drive means adapted to supply uniform, opposed, rotary motion to the paired disc members; flexible duct means originating within an external supply reservoir and terminating as a nozzle inside each contoured cover, said duct means and associated nozzle positioned and adapted to direct a uniform supply of a flowable material to the bristle area of the disc members. The apparatus and the operation of the apparatus of our invention will be more easily elucidated by recourse to the accompanying drawings of which:

Figure 1:
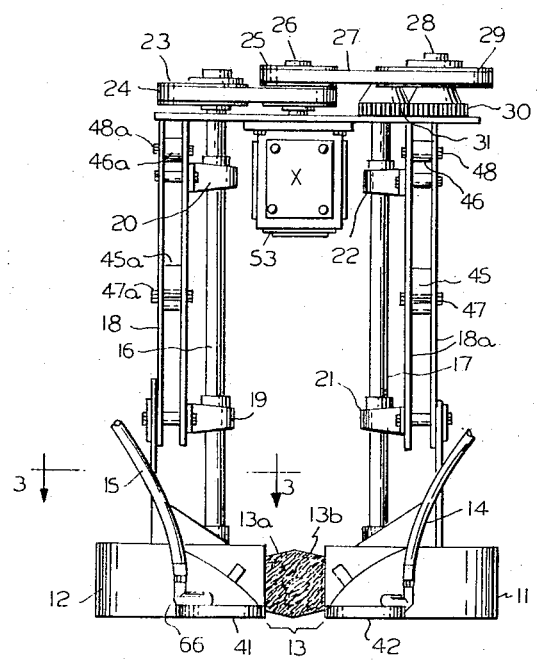
FIGURE 1 is a front or head-on view of the apparatus showing one unit (a pair of bristle tipped rotary applicators).

Referring now to FIGURE 1, items 11 and 12 are individual casings which enclose one each of a pair of bristle tipped disc members, the meshed bristle tips 13a and 13b of which members are indicated by the bracketed area designated 13. Casings 11 and 12 are provided with outwardly flaring plant-gathering bars 41 and 42, respectively. Items 14 and 15 are flexible ducts that deliver, from a supply reservoir (not shown), the flowable material which is to be distributed on the plant stalks by the rotary, bristle tipped, disc members. These ducts terminate as nozzle tips (not shown) within the respective casings adjacent to and directed toward the bristle area of the associated disc members. The disc members of a unit are driven in contra rotation, one with the other, by shafts 16 and 17. These shafts are journalled to rigid frames 18 and 18a, respectively, with bearing blocks 19 and 20 for shaft 16, and with bearing blocks 21 and 22 for shaft 17. Shaft 16, the lower end of which carries a rotary, bristle tipped, disc member, is provided at its upper end with a belt drive pulley 23. Pulley 23 is driven by belt 24 from double-grooved pulley 25, which latter is carried on drive shaft number 26. Drive shaft 26, which constitutes the main drive of the unit, is energized via the power take-off (not shown) from a prime mover which prime mover carries the unit. We have found it convenient to place a 90-degree gearbox 53 at location X, to take a horizontal shaft drive input from the power take-off of the prime mover and redirect this drive at right angles to the output drive shaft 16. Obviously, any other positive drive with which the peripheral speed of the rotating, bristle tipped, disc members can be maintained and coordinated with the ground speed of the prime mover, is equally operable. Double grooved pulley 25 also drives, via belt 27, pulley 29 and jack shaft 28. Jack shaft 28 carries spur gear 30, which drives a corresponding spur gear 31. The shafts, pulleys, belts, and associated gears provide the positive, equal, uniform, counter rotation of the paired bristle tipped disc members that are essential to the successful operation of our method for applying systemic insecticides to a row crop.

Figure 2:
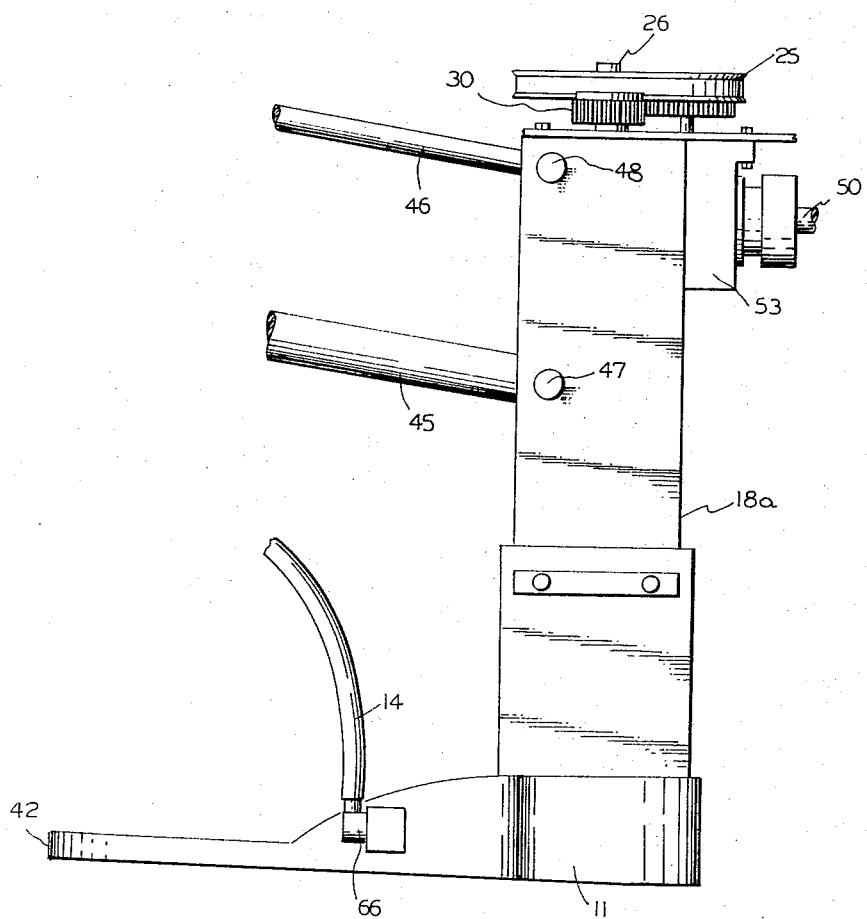
FIGURE 2 is a lateral view of the apparatus showing one of the two paired, bristle tipped, rotary brush applicator assemblies of a unit.
Figure 3:
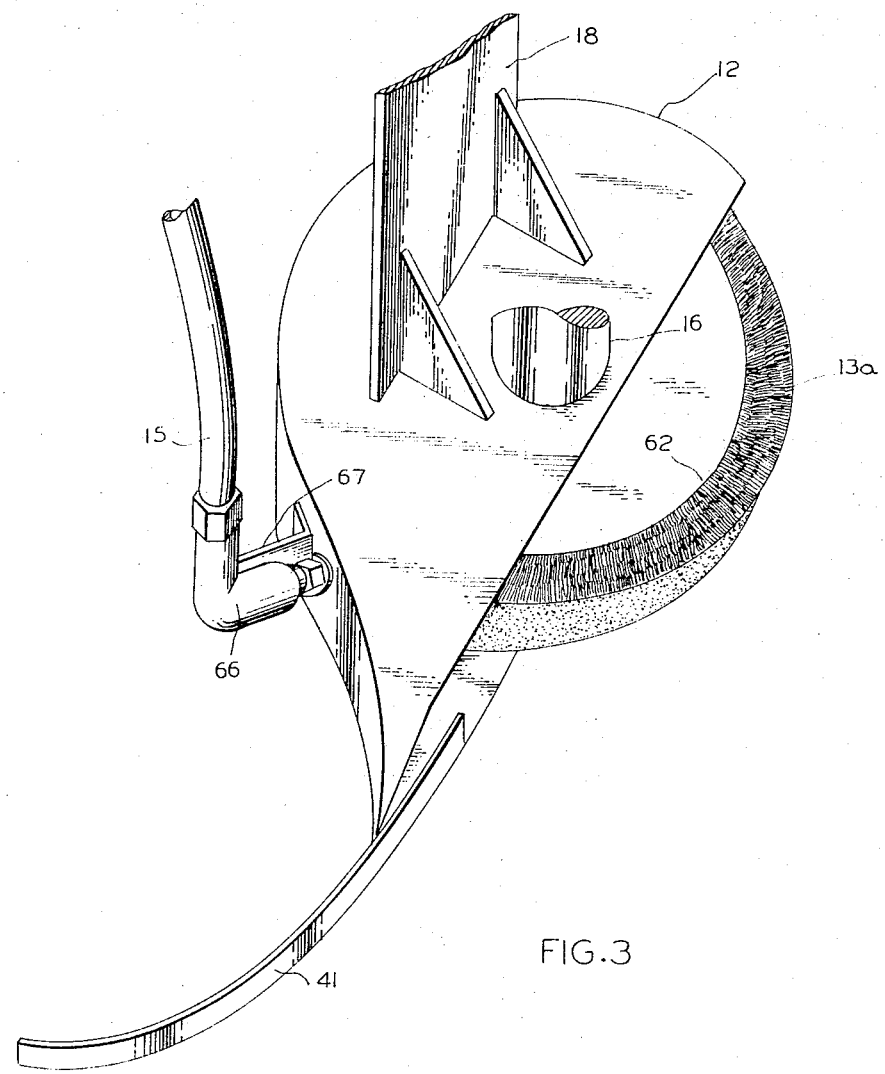
FIGURE 3 is a perspective plan section of one of a pair of bristle tipped rotary brush applicators, less the driving and the supporting means, taken on line 3—3 of FIGURE 1.

FIGURE 2, which is a side view of the apparatus, shows in somewhat more detail the casing 11 which shields and protects the bristle tipped disc member. The forward extending and outwardly flared plant-gathering bar 42, which is one of a pair provided for a unit, functions to intercept, erect, and direct the stalk portions of the individual plants of a row crop into the apparatus and between the contra rotating bristle tipped disc members of the unit. Item 15 is the flexible duct which conveys the flowable insecticide material from a supply reservoir (not shown) to the casing 12. The duct terminates as a nozzle tip (not shown) in the interior of the casing and is positioned to direct a continuous, uniform, supply of the flowable insecticide material onto the bristle area of the disc member. The rigid apparatus frames 18 and 18a support casings 11 and 12, the plant gathering bars, the paired disc members, and all of the associated shafting, pulleys, and gear drive mechanisms. The entire apparatus, as a unit or as multiples thereof, is linked to a prime mover via a parallel action linkage. The parallel action linkage consists of parallel bars 45, 45a, 46, and 46a linked to the rigid frame of the unit at pivot points 47, 47a, 48, and 48a, respectively. Counterpart pivot points link the distal ends of the parallel linkage bars (not shown) to the prime mover. The arrangement of the several pivot points is designed to allow substantially unrestricted independent, attitude controlled, motion of the apparatus in a vertical plane, but to prevent lateral motion of the apparatus relative the prime mover. Item 53 is a gear box which accepts, via the horizontal input shaft 50, rotary motion from the power take-off of the prime mover. The gear box redirects the rotary motion at 90 degrees, via appropriate gearing within the gear box, to the vertically directed output shaft 26. The output shaft carries the double-grooved pulley 25, which pulley, together with associated belting and spur gears, combine to drive the paired, bristle tipped, disc members in contra rotation and at uniform peripheral speed. FIGURE 3 is a still more detailed view of one of a pair of bristle tipped disc members, less the driving elements. Item 12 is the casing which encloses a portion of disc member 62 carrying bristles 13a. Disc member 62 is attached to and is driven with rotary motion by shaft 16. Plant guide bar 41 is attached to, projects forward and flares outward, laterally, from the casing. Flexible duct 15 carries the flowable insecticide material from a supply reservoir (not shown) to nozzle 66, the tip of which nozzle is inside the casing and is not visible, where it serves to direct the flowable insecticide material onto the bristle area of the disc member. The flexible duct and the nozzle assembly are attached to the casing with bracket 67. The casing is supported by a side member of the rigid apparatus frame 18.

The apparatus (i.e., a unit) operates as follows: a flowable, systemic insecticide composition, designed with such appropriate flow and adhesion characteristics as will facilitate the application of and the adhesion of the insecticide to selected stalk areas of a row crop, is carried in a supply reservoir. The supply reservoir is connected by means of flexible ducts to the nozzle tips which latter terminate inside the protective casings surrounding the bristle tipped disc members. The flowable insecticide material, either by virtue of gravity flow or, if expedient, by virtue of pump-induced flow, passes from the supply reservoir through the ducts to the nozzle tips and is distributed onto the bristle area of the disc members from whence it is applied by the meshed bristle tips to the individual plant stalks of the row crop. The supply reservoir, auxiliary pump (if required), the flexible ducts and the nozzles, together with the paired bristle tipped disc members and associated shielding, supporting, and driving means, are attached as a unit to, and energized by, a prime mover which prime mover can, with advantage be a conventional row crop tractor. The unit or multiples of the unit can conveniently be linked to a row crop tractor by means of a system of parallel bar supports, as described above. The units may be placed at any location convenient to the power take-off of the tractor, keeping in mind, however, that placement of the unit, whether single or multiple installations are utilized, must afford the tractor operator guiding visability. We have found that a paired disc unit placed on either side of a conventional four-wheel row crop tractor in a position lateral to and trailing the guiding wheels slightly is particularly convenient.

The paired, bristle-tipped, disc member units of which one and preferably two units are attached, appropriately spaced relative to the row crop, to the tractor, is moved down the crop row so that the stalk portions of each individual plant of the row crop, directed by the paired plant gathering bars, pass between the meshed, contra rotating bristle tips of the paired disc members. Insecticide is thereby literally painted, as an encircling band, onto the selected stalk area of each individual plant. The advantage should be noted, and this advantage will be appreciated by those skilled in the art of plant physiology generally and those skilled in the art of systemic insecticide application specifically, that the apparatus which is the subject of this invention will apply the systemic insecticide composition to the selected stalk areas of the plant as a band that completely girdles or encircles the plant stalk. If uniform translocation of the systemic insecticide to all aerial portions of the individual plant is contemplated, and uniform translocation must be contemplated if the maximum effect of the insecticide is to be realized, then a uniform gridling or band application is imperative.

Application of the insecticide by the use of our apparatus is uniform and efficient, there being little waste by reason of misdirection.

The performance of the apparatus and the method of this invention were evaluated both in the laboratory and in the field. In the case of the specific two-row (two unit) installation with which we performed the evaluation of the apparatus, the paired, bristle-tipped disc members in each of the two units were ten inches in diameter and two inches thick at the bristle tip area. The individual bristle length was two and three-eighths inches and the individual bristle diameter was one one-hundredths of an inch. The bristle tipped disc pairs were mounted, as described above, to rotate in a horizontal plane with an individual disc member directed along each side of the plant stalks of a row crop. The bristle tips of the paired disc members were designed to mesh within the drill area and thereby to distribute the systemic insecticide around the main stalk portions of the plants as a band.

The bristle tipped disc members were adjusted to operate near the base of the stalks of the plants, an inch or so above the ground line. Rotary motion, as noted above, was derived from the power take-off of a conventional row crop tractor. The ratio of tractor ground-travel to rotating disc peripheral speed being 1 to 1.25. All laboratory and field testing was done at a ground speed of 3.5 m.p.h. The field evaluation tests indicated that approximately 10 inches of stalk is required to obtain satisfactory performance with the apparatus. Most of the cotton treated in the experimental plots was from 10 to 20 inches tall, but in certain of the tests the cotton plants were 36 to 48 inches tall. However, the apparatus performed satisfactorily within this wide range of plant height. Durability of the nylon bristle elements has been proven satisfactory for large-scale operation. A total of 20 acres of cotton was treated with a two-row unit and following the experiment all parts of the apparatus, including the bristle tips, were found to be in excellent condition. The effectiveness of the method and of the apparatus was established by collecting the stalk portions of 20 consecutive plants in a row which had been treated with a dye containing insecticide formulation. These stalk sections were placed in test tubes containing ten milliliters of an acetone water solvent. The formulation was washed from the stems by agitation and the stem segments were then removed from the test tubes. The amount of dye in each sample was then determined with the aid of a colorimeter. This evaluating technique was calibrated to give a direct measurement of the applied volume of the insecticide per plant. The average volume of formulation applied per plant with the apparatus was 105.6 microliters under favorable field conditions. The actual discharge volume of formulation per plant was calculated to be about 171 microliters. Application efficiency therefore was a little better than 62%.

The results of a boll weevil bioassay experiment indicated that the apparatus was considerably more effective than a laterally directed stem spray treatment. In one experiment wherein insecticide was applied with the apparatus, the net mortality of weevils in three days was 66% on leaves harvested one day after treatment and 35% on leaves harvested eight days after treatment. A laterally directed stem spray treatment resulted in only 35% mortality on the leaves harvested one day after treatment and dropped to 11% mortality on leaves harvested eight days after treatment. A second bioassay test gave similar results with respective mortalities of 52% and 33% in the case of treatment by our apparatus and 26% and 15% mortality in the case of a laterally directed stem spray treatment. The cultural conditions for our field evaluations of the apparatus ranged as indicated above from precision planting, which is planting on preformed beds with total chemical weed control, to conventional planting combined with mechanical cultivation.

The method and the apparatus which are the subject of this invention provide an effective and an efficient way for applying a systemic insecticide to the stem portion of cotton plants. This has been demonstrated by effectively controlling field infestations of cotton fleahoppers, lygus bugs and the like. The hazards of drift and of atmospheric contamination are greatly reduced by the use of this method and this apparatus and the application is more efficient than are the applications associated with conventional methods and apparatus. Although our tests involved only systemic insecticide formulations, it is obvious that other chemicals of a systemic nature such as fungicides, hormones, and the like, could be applied using this method and this apparatus.

Having thus described our invention, we claim:

An apparatus for applying uniformly a flowable material, in the form of an encircling band, to selected areas of the ground proximal, substantially erect, stalk portions of the individual plants of a row crop comprising: paired disc members incorporating radially extended peripheral bristles, said disc members disposed horizontally in juxtaposition and with peripheral bristles tangentially meshed; means defining casings adapted to support rotatably and to shield said disc members, said means defining casings comprising separate, contoured covers enclosing each of said disc members, except for that segment of each disc member adjacent the location at which the bristles of the paired disc members are tangentially meshed; drive means adapted to supply uniform, opposed, rotary motion to the paired disc members; duct means terminating as nozzles inside each contoured cover, said duct means and associated nozzles adapted to direct a uniform supply of a flowable material from an external reservoir to the bristle areas of the disc members; supporting and linking means to couple the apparatus to a prime mover, said supporting and said linking means adapted to permit independent, attitude controlled movement of said apparatus in a vertical plane only.

References Cited by the Examiner

UNITED STATES PATENTS

| | | | |
|---|---|---|---|
| 1,523,590 | 1/1925 | Hartshorn | 47—1.5 |
| 1,539,789 | 5/1925 | Walker | 47—1.5 |
| 1,598,628 | 8/1926 | Walker | 47—1.5 |
| 2,171,160 | 8/1939 | Meiners | 47—1.41 |
| 2,223,809 | 12/1940 | Rucker | 47—1.5 |
| 2,684,555 | 7/1954 | Kantack | 47—1.41 |
| 2,935,818 | 5/1960 | Crane | 47—1.5 |

FOREIGN PATENTS

| | | |
|---|---|---|
| 473,059 | 4/1951 | Canada. |

ABRAHAM G. STONE, *Primary Examiner.*

ROBERT E. BAGWELL, *Examiner.*